(12) United States Patent
Nagano et al.

(10) Patent No.: US 9,240,036 B2
(45) Date of Patent: *Jan. 19, 2016

(54) PROJECTOR AND CONTROL METHOD FOR PROJECTOR

(71) Applicant: Seiko Epson Corporation, Tokyo (JP)

(72) Inventors: Miki Nagano, Shiojiri (JP); Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/298,888

(22) Filed: Jun. 7, 2014

(65) Prior Publication Data

US 2014/0267428 A1     Sep. 18, 2014

Related U.S. Application Data

(63) Continuation of application No. 13/230,132, filed on Sep. 12, 2011, now Pat. No. 8,780,280.

(30) Foreign Application Priority Data

Sep. 16, 2010   (JP) .................................. 2010-207676

(51) Int. Cl.
| H04N 7/18 | (2006.01) |
| G06T 5/00 | (2006.01) |
| G06T 3/40 | (2006.01) |
| H04N 9/31 | (2006.01) |
| H04N 7/01 | (2006.01) |

(52) U.S. Cl.
CPC . G06T 5/006 (2013.01); G06T 3/40 (2013.01); H04N 7/0122 (2013.01); H04N 9/3185 (2013.01); H04N 9/3194 (2013.01)

(58) Field of Classification Search
CPC ........ G06T 5/006; G06T 3/40; H04N 7/0122; H04N 9/3185; H04N 9/3194
USPC ............................ 348/135; 356/121; 351/224
See application file for complete search history.

(56) References Cited

U.S. PATENT DOCUMENTS 4,679,935 A * 7/1987 Fukuda et al. ................. 356/121
5,461,431 A   10/1995 Takebuchi et al.
(Continued)

FOREIGN PATENT DOCUMENTS

EP   1983 745 A1   10/2008
JP   2003-289485 A   10/2003
(Continued)

OTHER PUBLICATIONS

Non-Final Office Action received in U.S. Appl. No. 13/230,132, filed Aug. 30, 2013.
(Continued)

*Primary Examiner* — Gims Philippe
(74) *Attorney, Agent, or Firm* — ALG Intellectual Property, LLC

(57) ABSTRACT

In one embodiment, a control method for a projector comprises picking up an image of an area including a screen and an image light and generating a picked-up image; calculating each side of an outer peripheral line of the image light, based on the picked-up image; calculating each side of an outer peripheral line of the screen, based on the picked-up image; and calculating a correction image light modulation area that is an area in a part of a light modulation area so as to fit inside a second imaginary screen outer peripheral line.

12 Claims, 5 Drawing Sheets

(56) References Cited

U.S. PATENT DOCUMENTS

| | | |
|---|---|---|
| 5,825,427 A | 10/1998 | MacLeod |
| 6,721,885 B1 * | 4/2004 | Freeman et al. ............ 713/2 |
| 6,753,907 B1 | 6/2004 | Sukthankar et al. |
| 6,932,480 B2 | 8/2005 | Wada et al. |
| 7,125,122 B2 | 10/2006 | Li et al. |
| 7,220,000 B2 * | 5/2007 | Alster et al. ............ 351/224 |
| 7,347,564 B2 | 3/2008 | Matsumoto et al. |
| 7,404,645 B2 | 7/2008 | Margulis |
| 7,494,229 B2 | 2/2009 | Miyasaka |
| 7,495,681 B2 | 2/2009 | Liu et al. |
| 7,802,288 B2 | 9/2010 | Sie et al. |
| 7,830,401 B2 | 11/2010 | Sonobe |
| 7,909,470 B2 | 3/2011 | Yonezawa |
| 8,459,805 B2 | 6/2013 | Nakagawa et al. |
| 2001/0048483 A1 | 12/2001 | Steinberg et al. |
| 2003/0043303 A1 | 3/2003 | Karuta et al. |
| 2004/0061838 A1 | 4/2004 | Mochizuki et al. |
| 2005/0062939 A1 | 3/2005 | Tamura |
| 2006/0038962 A1 | 2/2006 | Matsumoto et al. |
| 2006/0114246 A1 | 6/2006 | Young |
| 2008/0024514 A1 | 1/2008 | Matsuda |
| 2009/0268986 A1 | 10/2009 | Holstein et al. |
| 2012/0032978 A1 | 2/2012 | Chae et al. |
| 2012/0086924 A1 | 4/2012 | Moon et al. |
| 2013/0071034 A1 | 3/2013 | Kunkel et al. |

FOREIGN PATENT DOCUMENTS

| | | |
|---|---|---|
| JP | 2006-60447 A | 3/2006 |
| JP | 2007-53784 A | 3/2007 |
| JP | 2009-118300 A | 5/2009 |

OTHER PUBLICATIONS

Notice of Allowance and Notice of Allowability received in U.S. Appl. No. 13/230,132, filed Mar. 11, 2014.

* cited by examiner

PROJECTOR AND CONTROL METHOD FOR PROJECTOR

CROSS-REFERENCE

The present application is a continuation of U.S. patent application Ser. No. 13/230,132 filed Sep. 12, 2011, which claims priority from Japanese Patent Application No. 2010-207676 filed on Sep. 16, 2010, which are hereby incorporated by reference in their entirety.

BACKGROUND

1. Technical Field

The present invention relates to a projector and a control method for a projector.

2. Related Art

Traditionally, a projector is known which picks up an image of a screen using an image pickup device such as CCD, detects the four sides of a screen frame from the picked-up image, and corrects a projection image according to the screen frame. JP-A-2006-60447 discloses a projector which, when only three or fewer sides of a screen frame are detected, estimates the side (s) that cannot be detected on the basis of the detected sides and corrects an image according to the screen frame.

However, in some cases where the aspect ratio of the screen frame is different from the aspect ratio of a projected image from the projector, the position of the side(s) that cannot be detected cannot be estimated (calculated) correctly and the projected image cannot be suitably corrected according to the screen frame. Particularly when an output image from the projector is a wide type with an aspect ratio of 16:10 (or 16:9) while the screen frame has an aspect ratio of 4:3 and the projection distance is short, the projected image cannot be suitably corrected and the projected image may spread out of the screen frame.

SUMMARY

An advantage of some aspects of the invention is to solve at least a part of the problems described above and the invention can be implemented as the following forms or application examples.

Application Example 1

According to this application example, a projector for displaying an image on a screen includes: a light source; a light modulation device having a light modulation area for modulating light that exits the light source to effective image light representing an image; an image pickup unit which picks up an image of an area including the screen and the image light and generates a picked-up image; a first outer peripheral line calculating unit which calculates each side of an outer peripheral line of the image light, based on the picked-up image; a second outer peripheral line calculating unit which calculates each side of an outer peripheral line of the screen, based on the picked-up image; an imaginary screen outer peripheral line calculating unit which, when the second outer peripheral line calculating unit detects three of four sides of the outer peripheral line of the screen in the picked-up image, calculates a first imaginary screen outer peripheral line by supplementing one side that is undetected with one side of the outer peripheral line of the image light calculated by the first outer peripheral line calculating unit; an imaginary screen aspect ratio calculating unit which calculates an imaginary screen aspect ratio that is an aspect ratio of an area defined by the first imaginary screen outer peripheral line; an imaginary aspect ratio determining unit which determines whether the imaginary screen aspect ratio is more vertically oriented than a first ratio or not; an imaginary screen outer peripheral line re-calculating unit which, when a result of determination by the imaginary aspect ratio determining unit is more vertically oriented than the first ratio, changes the imaginary screen aspect ratio to a second ratio that is different from the first ratio, calculates the one undetected side according to the second ratio, corrects the first imaginary screen outer peripheral line, and calculates a second imaginary screen outer peripheral line; and a correction image light modulation area calculating unit which calculates a correction image light modulation area that is an area in a part of the light modulation area so as to fit inside the second imaginary screen outer peripheral line.

In such a projector, the first outer peripheral line calculating unit calculates each side of an outer peripheral line of image light, based on a picked-up image. The second outer peripheral line calculating unit calculates each side of an outer peripheral line of the screen, based on the picked-up image. The imaginary screen outer peripheral line calculating unit calculates a first imaginary screen outer line by supplementing one undetected side of the outer peripheral line of the screen with one side of the outer peripheral line of the image light. The imaginary screen aspect ratio calculating unit calculates an aspect ratio of an area defined by the first imaginary screen outer peripheral line. The imaginary aspect ratio determining unit determines whether the imaginary screen aspect ratio is more vertically oriented than a first ratio or not. When the result of the determination is more vertically oriented than the first ratio, the imaginary screen outer peripheral line re-calculating unit changes the imaginary screen aspect ratio to a second ratio that is different from the first ratio, calculates the one undetected side according to the second ratio, and calculates a second imaginary screen outer peripheral line. The correction image light modulation area calculating unit calculates a correction image light modulation area so as to fit inside the second imaginary screen outer peripheral line. Thus, even when one side of the screen cannot be detected and the aspect ratio of the screen is different from the aspect ratio of the light modulation area of the projector, the projected image can be corrected to fit within the screen.

Also, since an image such that the aspect ratio of the light modulation area is maintained is projected on the screen, distortion of the projected image can be avoided.

Moreover, since an image is projected in such a way that the image is inscribed within the second imaginary screen outer peripheral line, visibility of the projected image is improved.

Also, when an image is projected on a commercially available screen with an aspect ratio of 4:3 from the projector in which the light modulation area has an aspect ratio of 16:10, even if one side of the screen cannot be detected, the projected image can be corrected to fit within the screen.

Moreover, even when one side of the screen cannot be detected and the aspect ratio of the screen is different from the aspect ratio of the light modulation area of the projector, the projected image can be corrected to fit within the screen.

Furthermore, in the case where the above projector and a control method for the projector are constructed using a computer provided in the projector, the above form and application example can be configured in the form of a program for realizing the functions thereof, or a recording medium or the like in which the program is recorded in a computer-readable manner. As the recording medium, various media readable by the computer can be used such as flexible disk, hard disk, CD-ROM (compact disk read only memory), DVD (digital versatile disk), Blu-ray Disc (trademark registered), magneto-optical disc, non-volatile memory card, internal storage device of the projector (semiconductor memory such as RAM (random access memory) or ROM (read only memory)), and external storage device (USB (universal serial bus) memory).

BRIEF DESCRIPTION OF THE DRAWINGS

The invention will be described with reference to the accompanying drawings, wherein like numbers reference like elements.

FIG. 4A is an explanatory view showing a full projection area, a screen frame and an image pickup area. FIG. 4B is an explanatory view showing the screen frame, an image pickup area and an imaginary screen frame.

FIG. 5A is an explanatory view showing a screen frame and an imaginary screen frame. FIG. 5B is an explanatory view showing the screen frame and a re-calculated imaginary screen frame. FIG. 5C is an explanatory view showing the screen frame, the re-calculated imaginary screen frame and a correction image.

DESCRIPTION OF EXEMPLARY EMBODIMENTS

Hereinafter, embodiments will be described.

Embodiments

In this embodiment, a projector which has an image pickup device and corrects an image to fit inside an outer peripheral line of an external screen (also referred to as a "screen frame") will be described.

Figure 1:
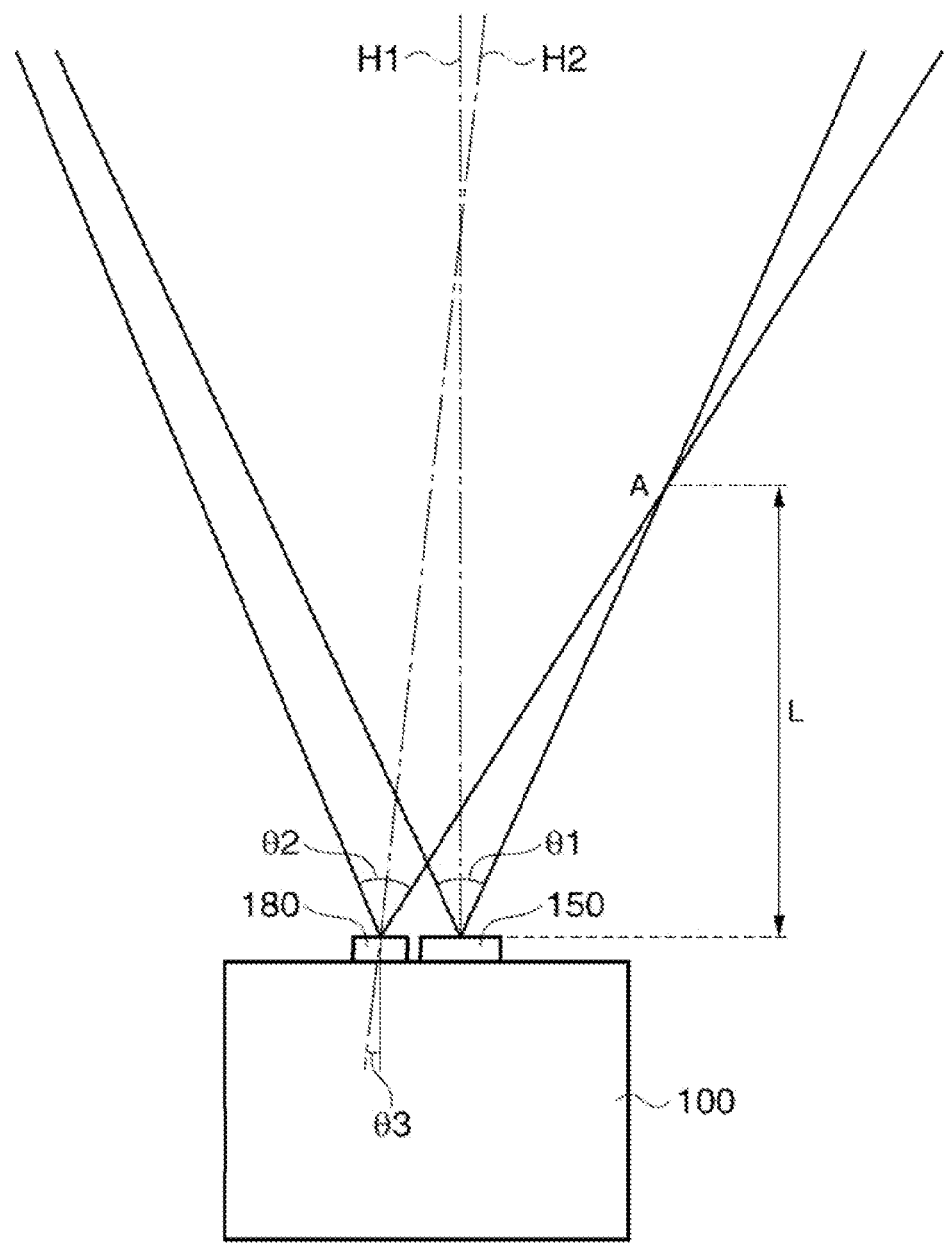
FIG. 1 is an explanatory view showing a projector according to an embodiment, as viewed from above.

FIG. 1 is an explanatory view showing a projector according to this embodiment, as viewed from above. As shown in FIG. 1, a projection system (projection lens) 150 and an image pickup unit (image pickup device) 180 are installed on the front side of the body of a projector 100 in a way that the projection system 150 and the image pickup unit 180 are next to each other. Here, a projection angle of view that is the angle of view at which the projection system 150 projects an image is illustrated as θ1, and the center line of the projection angle of view is illustrated as H1. An image pickup angle of view that is the angle of view at which the image pickup unit 180 picks up an image is illustrated as θ2 (θ2>θ1), and the center line of the image pickup angle of view is illustrated as H2. The image pickup unit 180 is installed in an inclined state toward the projection system 150 by an angle θ3 in relation to the direction of the optical axis of the projection system 150 (that is, the direction of the center line H1).

In this manner, the projection system 150 and the image pickup unit 180 are installed at different positions. Therefore, across a distance L from the projector 100 to a point of intersection A between the projection angle of view and the image pickup angle of view, the image pickup unit 180 cannot pick up an image of the vicinity of the right end of an image projected from the projection system 150. If the difference between the projection angle of view θ1 and the image pickup angle of view θ2 is small, the range where image pickup is unavailable increases.

Figure 2:
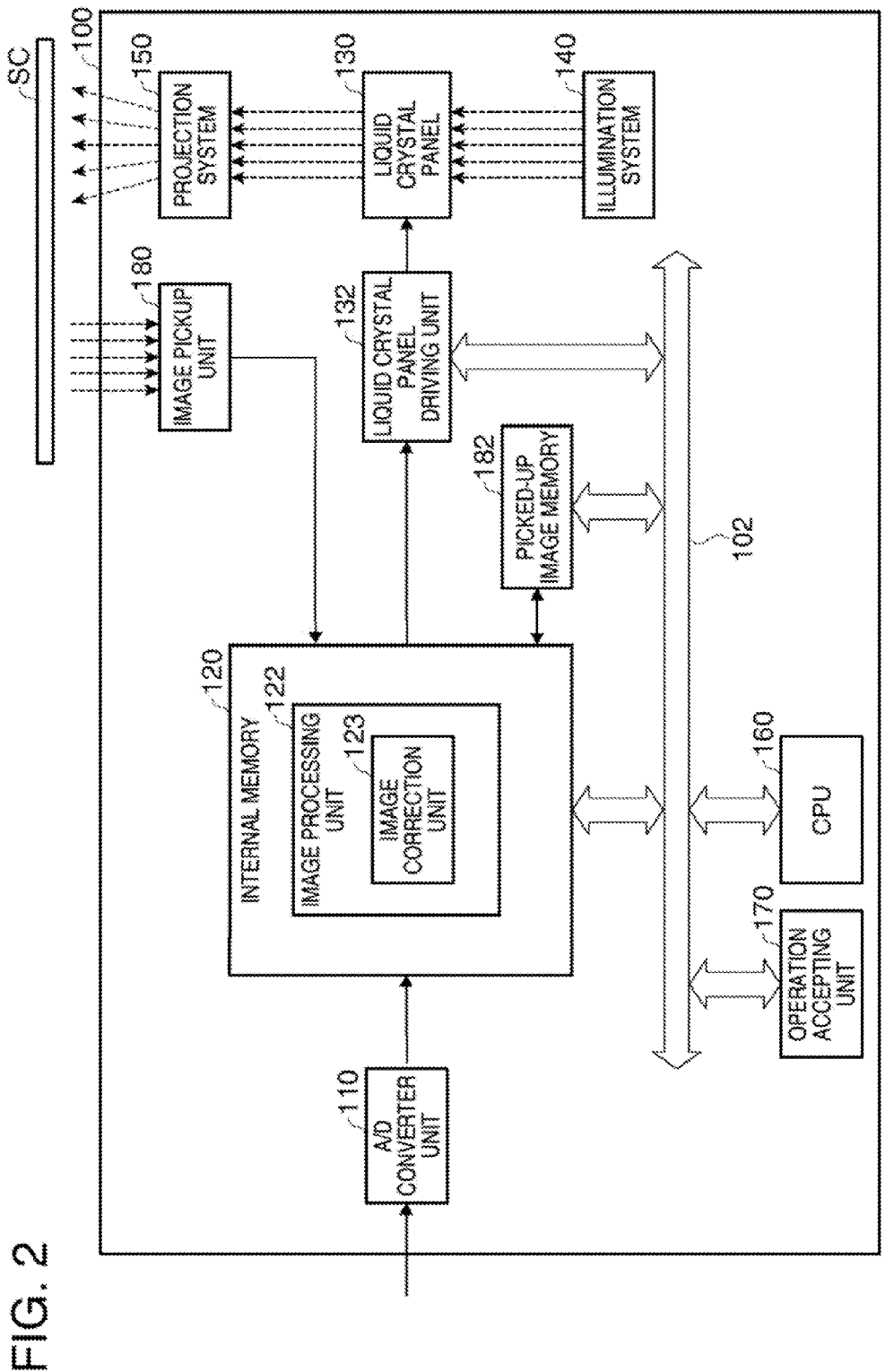
FIG. 2 is a block diagram showing the schematic configuration of the projector.

FIG. 2 is a block diagram showing the schematic configuration of the projector 100 according to the embodiment. The internal configuration of the projector 100 will be described with reference to FIG. 2. The projector 100 projects image light representing an image and displays the image (hereinafter referred to as a "projected image") on a screen such as a screen SC. The screen SC has an aspect ratio of 4:3.

The projector 100 has an A/D converter unit 110, an internal memory 120, a liquid crystal panel 130 and a light crystal panel driving unit 132 as an image forming panel unit, an illumination system 140 as a light source, the projection system 150, a CPU 160, an operation accepting unit 170, the image pickup unit 180 as an image pickup section, a picked-up image memory 182 and the like. Here, the internal memory 120, the liquid crystal panel driving unit 132, the CPU 160, the operation accepting unit 170 and the picked-up image memory 182 are connected with each other via a bus 102.

The A/D converter unit 110 has various image input terminals for connecting with an external image supply device (not shown) such as a personal computer, video reproduction device, memory card, USB storage or digital camera, via a cable. An image signal is inputted to the A/D converter unit 110 from the image supply device. The A/D converter unit 110 performs A/D conversion as needed and outputs a digital image signal.

In the internal memory 120, a computer program functioning as an image processing unit 122 is stored. The image processing unit 122 adjusts the display state of the image (for example, luminance, contrast, synchronization, tracking, color density, color tone and the like) for the digital image signal outputted from the A/D converter 110, and outputs the digital image signal to the liquid crystal panel driving unit 132. The image processing unit 122 has an image correction unit 123 which corrects the image to fit within the screen SC.

The liquid crystal panel driving unit 132 drives the liquid crystal panel 130 as a light modulation device, based on the digital image signal inputted via the image processing unit 122. The liquid crystal panel 130 forms an image for modulating illuminating light cast from the illumination system 140 to effective image light representing an image, in a light modulation area on the surface (also referred to as a "panel surface") of the liquid crystal panel 130. In this embodiment, the light modulation area is assumed to be coincident with the liquid crystal panel 130. However, the light modulation area may be a smaller area than the entire panel surface of the liquid crystal panel 130. The liquid crystal panel 130 has an aspect ratio of 16:10.

The projection system 150 is installed on the front side of the casing of the projector 100 and projects the light modulated to the image light by the liquid crystal panel 130, in an enlarged state.

The operation accepting unit 170 has plural keys and the like for giving various instructions to the projector 100. The keys provided in the operation accepting unit 170 may include a "power key" for turning power on and off, an "input switch key" for switching inputted image signals, a "menu key" for switching between display and non-display of a menu screen on which various settings are performed, a "cursor key" used to move a cursor in the menu screen, a "decision key" for deciding various settings, an "image correction key" for correcting a projected image to fit within the frame of the screen SC, and the like. As the user operates the operation accepting unit 170, the operation accepting unit 170 outputs control information corresponding to the user's operation content to the CPU 160 via the bus 102. The operation accepting unit 170 may also be configured with a remote control signal receiving unit (not shown) and a remote controller capable of remote control. In this case, the remote controller issues an operation signal of infrared rays corresponding to the user's operation content, and the remote control signal receiving unit receives this operation signal and transmits the operation signal to the CPU 160 as control information.

The CPU 160 reads out and executes the computer program as the image processing unit 122 from the internal memory 120, thus projecting an image on the screen SC or performing image processing such as image correction processing, which will be described later. The CPU 160 also generally controls operation of each unit within the projector 100.

The image pickup unit 180 has a CCD camera and generates a picked-up image. The picked-up image generated by the image pickup unit 180 becomes stored in the picked-up image memory 182 via the internal memory 120. The image pickup unit 180 can also have another image pickup device instead of the CCD camera.

Figure 3:
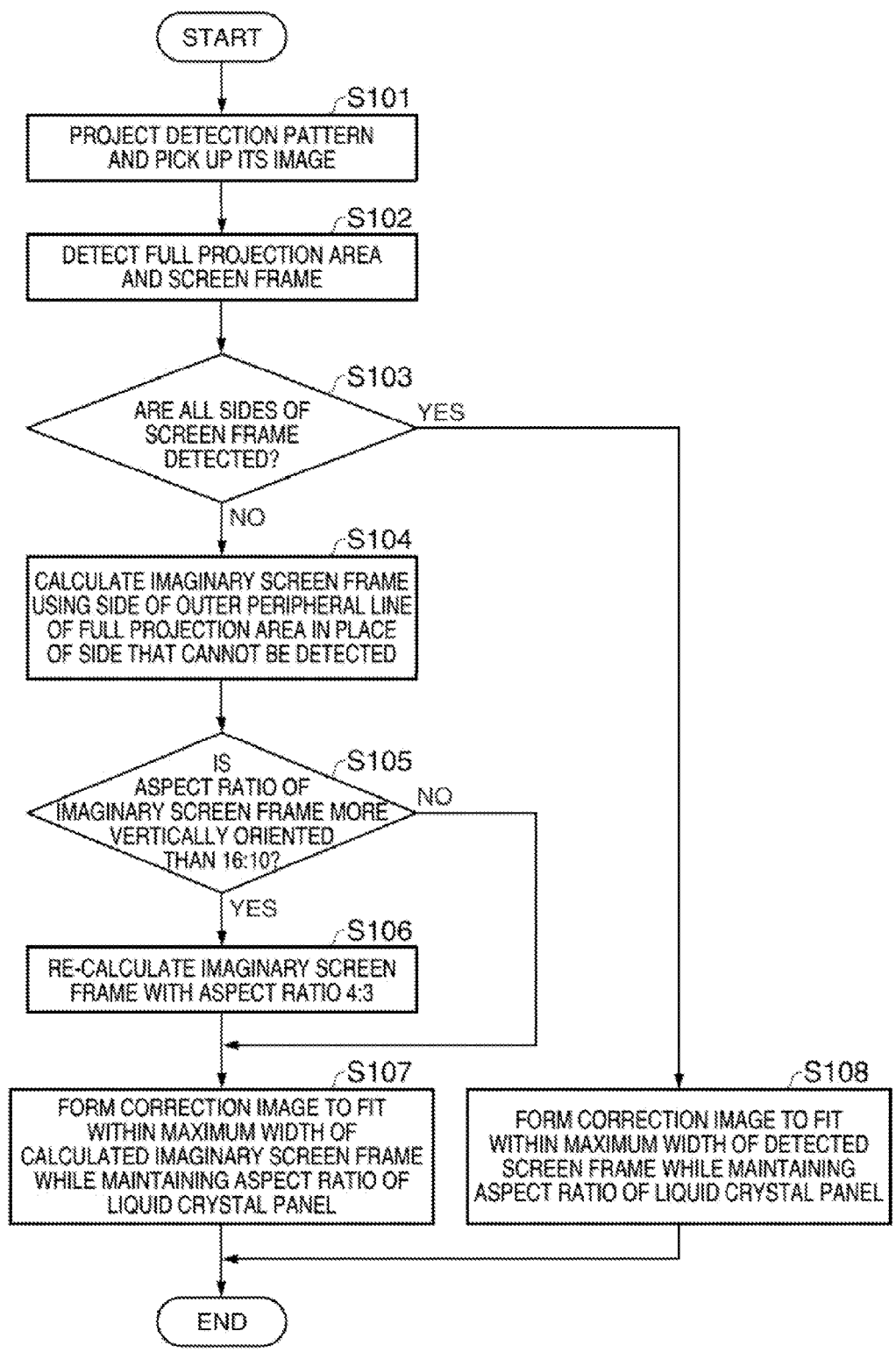
FIG. 3 is a flowchart of image correction processing in the projector.

Next, image correction processing in which the projector 100 corrects a projected image to fit inside the outer peripheral line of the screen SC (hereinafter referred to as a "screen frame SF") will be described. FIG. 3 is a flowchart of the image correction processing in the projector 100. The CPU 160 carries out the image correction processing according to a program provided in the image correction unit 123.

When the image correction key provided on the operation accepting unit 170 is pressed, the CPU 160 causes a predetermined detection pattern image to be projected which is for detecting the full projection area on the liquid crystal panel 130, and the image pickup unit 180 picks up the projected image (step S101). The CPU 160 analyzes the picked-up image and detects the full projection area and the screen frame SF (step S102). The CPU 160 which detects the full projection area is equivalent to the first outer peripheral line calculating unit. The CPU 160 which detects the screen frame SF is equivalent to the second outer peripheral line calculating unit. As a method for detecting the full projection area and the screen frame SF, a known method is used (see, for example, JP-A-2006-60447).

The CPU 160 determines whether all the sides of the screen frame SF are detected or not (step S103). If all the sides of the screen frame SF are not detected (step S103: NO), the CPU 160 calculates an imaginary screen frame using a side of the outer peripheral line of the full projection area in place of the side that cannot be detected (step S104). This imaginary screen frame is equivalent to the first imaginary screen outer peripheral line. The CPU 160 in this case is equivalent to the imaginary screen outer peripheral line calculating unit.

Now, the calculation of the imaginary screen frame will be described with reference to the drawings.

Figure 4A:
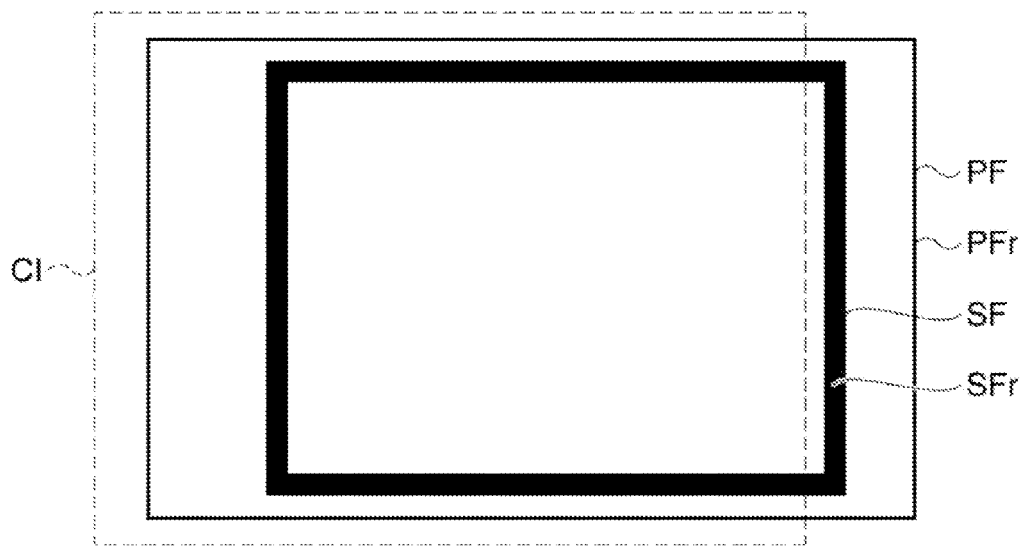
FIGS. 4A and 4B are explanatory views of calculation of an imaginary screen frame.
Figure 4B:
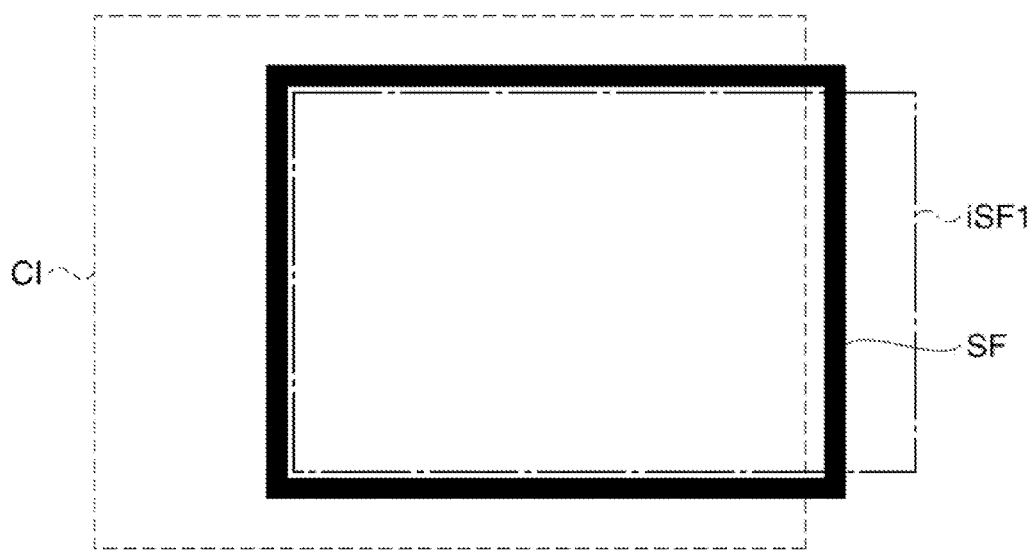

FIGS. 4A and 4B are explanatory views for the calculation of the imaginary screen frame. FIG. 4A is an explanatory view showing the full projection area, the screen frame SF and the image pickup area. FIG. 4B is an explanatory view showing the screen frame SF, the image pickup area and the imaginary screen frame.

In FIG. 4A, a full projection area PF is illustrated as including the screen frame SF. That is, a predetermined detection pattern image is projected to include the screen frame SF. Here, the screen frame SF has an aspect ratio of 4:3 and the full projection area PF has an aspect ratio of 16:10. A right side SFr of the screen frame SF and a right side PFr of the full projection area PF are not included in an image pickup area CI. In this state, the CPU 160 cannot detect one side (the right side SFr) of the screen frame SF. However, the CPU 160 can calculate the right side PFr of the full projection area PF as the right end position of the liquid crystal panel 130.

FIG. 4B shows a state where an imaginary screen frame iSF1 is calculated. The imaginary screen frame iSF1 is indicated by a chain dotted line. Three sides (left side, top side and bottom side) of the imaginary screen frame iSF1 are at the same positions as the three sides detected in the screen frame SF. The remaining one side (right side) is at the position of the right side PFr of the full projection area PF. The imaginary screen frame iSF1 is calculated in this manner.

Back to FIG. 3, the CPU 160 determines whether the aspect ratio (horizontal:vertical) of the calculated imaginary screen frame iSF1 is more vertically oriented than 16:10 or not (step S105). The CPU 160 in this case is equivalent to the imaginary screen aspect ratio calculating unit and the imaginary aspect ratio determining unit. If the aspect ratio of the imaginary screen frame iSF1 is more vertically oriented than 16:10 (step S105: YES), the CPU 160 determines that the aspect ratio of the actual screen SC (screen frame SF) is 4:3, and re-calculates an imaginary screen frame iSF2 with an aspect ratio of 4:3 based on the three sides detected in the screen frame SF (step S106). The imaginary screen frame iSF2 is equivalent to the second imaginary screen outer peripheral line. The CPU 160 in this case is equivalent to the imaginary screen outer peripheral line re-calculating unit.

Then, the CPU 160 forms a correction image to fit within a maximum width of the calculated imaginary screen frame (here, imaginary screen frame iSF2) while maintaining the aspect ratio (16:10) of the liquid crystal panel 130 (step S107). The CPU 160 in this case is equivalent to the correction image light modulation area calculating unit. For the correction image forming processing by the correction image light modulation area calculating unit, a known processing method is used (see, for example, JP-A-2006-60447). Then, the image correction processing ends.

Now, the re-calculation of the imaginary screen frame and the formation of the correction image will be described with reference to the drawings.

Figure 5A:
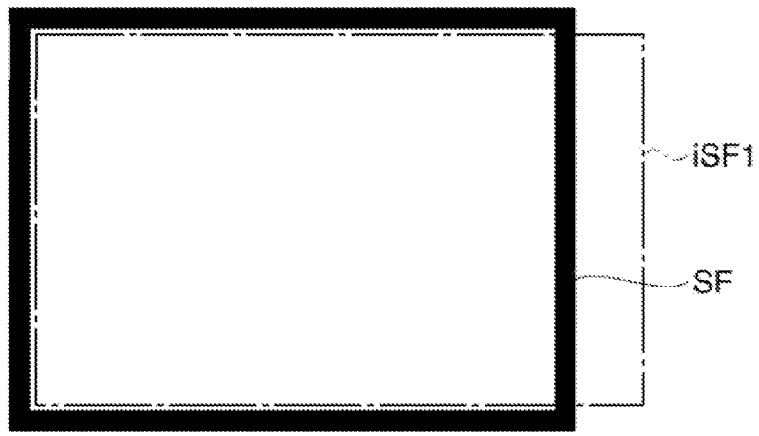
FIGS. 5A to 5C are explanatory views of re-calculation of an imaginary screen frame and formation of a correction image.
Figure 5B:
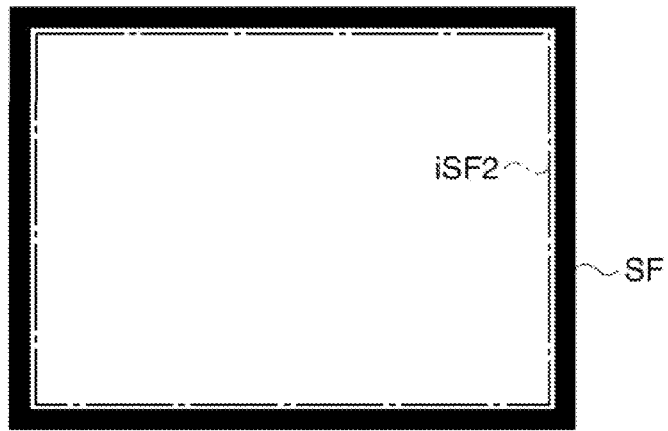
Figure 5C:
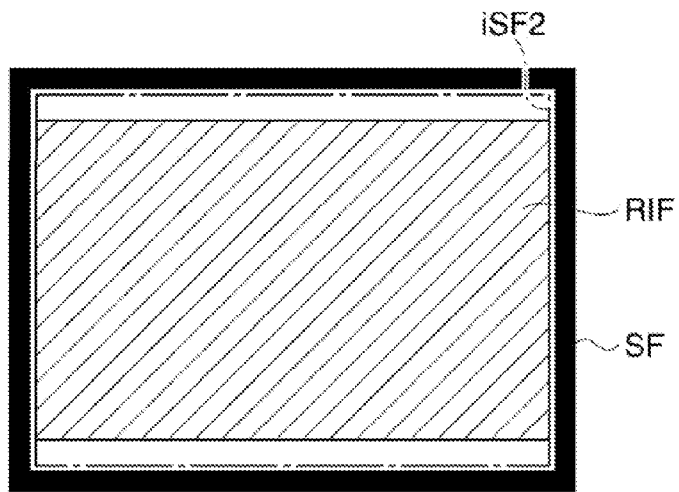

FIGS. 5A to 5C are explanatory views for the re-calculation of the imaginary screen frame and the formation of the correction image. FIG. 5A is an explanatory view showing the screen frame SF and the imaginary screen frame iSF1. FIG. 5B is an explanatory view showing the screen frame SF and the re-calculated imaginary screen frame iSF2. FIG. 5C is an explanatory view showing the screen frame SF, the re-calculated imaginary screen frame iSF2 and the correction image.

FIG. 5A shows a state where the imaginary screen frame iSF1 is calculated. FIG. 5B shows the state of the re-calculated imaginary screen frame iSF2. The imaginary screen frame iSF2 has an aspect ratio of 4:3 and therefore has a shape that fits within the screen frame SF. In FIG. 5C, a correction image RIF maintaining the aspect ratio (16:10) of the liquid crystal panel 130 is formed in the imaginary screen frame iSF2.

Back to FIG. 3, if the aspect ratio of the imaginary screen frame iSF1 is not more vertically oriented than 16:10 (step S105: NO), the CPU 160 shifts to step S107 without re-calculating the imaginary screen frame, and forms the correction image RIF to fit longitudinally or laterally within the maximum width of the calculated imaginary screen frame (here, the imaginary screen frame iSF1) while maintaining the aspect ratio (16:10) of the liquid crystal panel 130. Then, the image correction processing ends.

If all the sides of the screen frame SF are detected (step S103: YES), the correction image RIF is formed to fit longitudinally or laterally within the maximum width of the detected screen frame SF while maintaining the aspect ratio (16:10) of the liquid crystal panel 130 (step S108). Then, the image correction processing ends.

As described above, the projector 100 corrects the correction image RIF to fit within the screen frame SF.

The above embodiment has the following effects.

(1) If the aspect ratio of imaginary screen frame iSF1 is more vertically oriented than 16:10, the projector 100 re-calculates the imaginary screen frame iSF2 on the assumption that the aspect ratio is 4:3. Then, the correction image is formed to fit inside the imaginary screen frame iSF2 with the aspect ratio of 4:3. Therefore, even when one side of the screen frame SF cannot be detected and the aspect ratio of the screen frame SF is different from the aspect ratio of the liquid crystal panel 130 of the projector 100, the projected image can be corrected to fit within the screen frame SF. Thus, spreading of the projected image from the screen frame SF with the aspect ratio of 4:3 can be avoided and the user can visually recognize a preferable projected image.

(2) The projector 100 forms the correction image maintaining the aspect ratio of the liquid crystal panel 130 in relation to the imaginary screen frames iSF1 and iSF2. Therefore, since the image maintaining the aspect ratio of the liquid crystal panel 130 is projected on the screen SC, distortion of the projected image can be avoided. Thus, the user can visually recognize a preferable projected image.

(3) The projector 100 calculates the correction image with the longitudinal or lateral maximum width of (that is, inscribed within) the imaginary screen frames iSF1 and iSF2 while maintaining the aspect ratio of the liquid crystal panel 130 in relation to the imaginary screen frames iSF1 and iSF2. Thus, the image is projected with the maximum width within the screen frame SF and therefore visibility of the projected image is improved.

(4) When the aspect ratio of the imaginary screen frame iSF1 is not more vertically oriented than 16:10, the projector 100 forms the correction image to fit inside the imaginary screen frame iSF1. Thus, when one side of the screen frame SF cannot be detected and the aspect ratio of the screen frame SF is more horizontally oriented than 4:3, the projected image is corrected with the longitudinal or lateral maximum width to fit within the imaginary screen frame iSF1 on the assumption that the screen frame SF has the aspect ratio of 16:10 or is more horizontally oriented. Therefore, the user can visually recognize a preferably projected image maintaining the aspect ratio of the liquid crystal panel 130.

(5) When all the sides of the screen frame SF are detected, the projector 100 can corrects the projected image maintaining the aspect ratio of the liquid crystal panel 130 to fit inside the detected screen frame SF. Therefore, the user can visually recognize a preferable projected image.

(6) In the projector 100, the first ratio is 16:10 and the second ratio is 4:3. Thus, when an image is projected on a commercially available screen SC with an aspect ratio of 4:3 from the projector 100 having the liquid crystal panel 130 with an aspect ratio of 16:10, even if one side of the screen cannot be detected, the projected image can be corrected to fit within the screen, which is advantageous.

(7) Since the projector 100 performs image correction processing, the image pickup angle of view of the image pickup unit 180 need not be an unnecessarily wide angle in relation to the projection angle of view of the projection system 150. That is, the image pickup device such as a CCD camera used in the image pickup unit 180 need not have an unnecessarily wide angle. Therefore, the degree of freedom in component selection at the time of product designing. Moreover, the allowable range of the installation angle of the image pickup unit 180 can be expanded.

The invention is not limited to the above embodiment and can be carried out with various changes, improvements and the like. Modifications will be described hereinafter.

Modification 1

The first ratio is 16:10 in the embodiment, but may also be 16:9.

Modification 2

The image processing unit 122 is a computer program in the embodiment, but may also be configured with a circuit device (not shown) which performs image processing.

Modification 3

In the embodiment, the transmission-type liquid crystal panel 130 is used as the light modulation device. However, a reflection-type light modulation device such as a reflection-type liquid crystal panel can also be used. Moreover, a micro mirror array device or the like which modulates light exiting a light source by controlling the exit direction of the incident light for each micro mirror as a pixel can be used.

What is claimed is:

1. A projector for displaying an image on a screen comprising:
   a light source;
   a light modulation device having a light modulation area for modulating light that exits the light source to effective image light representing an image;
   an image pickup unit which picks up an image of an area including the screen and the image light and generates a picked-up image;
   a first outer peripheral line calculating unit which calculates each side of an outer peripheral line of the image light, based on the picked-up image;
   a second outer peripheral line calculating unit which calculates each side of an outer peripheral line of the screen, based on the picked-up image;
   an imaginary screen outer peripheral line calculating unit which, when the second outer peripheral line calculating unit detects three of four sides of the outer peripheral line of the screen in the picked-up image, calculates a first imaginary screen outer peripheral line by supplementing one side that is undetected with one side of the outer peripheral line of the image light calculated by the first outer peripheral line calculating unit;
   an imaginary screen outer peripheral line re-calculating unit which, when an aspect ratio of an area defined by the first imaginary screen outer peripheral line is more vertically oriented than a first ratio, calculates the one undetected side according to a second ratio that is different from the first ratio, and calculates a second imaginary screen outer peripheral line that is different from the first imaginary screen outer peripheral line; and
   a correction image light modulation area calculating unit which calculates a correction image light modulation area that is an area in a part of the light modulation area so as to fit inside the second imaginary screen outer peripheral line.

2. The projector according to claim 1, wherein the correction image light modulation area calculating unit calculates the correction image light modulation area maintaining an aspect ratio of the light modulation area in relation to the second imaginary screen outer peripheral line.

3. The projector according to claim 2, wherein the correction image light modulation area calculating unit calculates the correction image light modulation area to be inscribed within the second imaginary screen outer peripheral line.

4. The projector according to claim 1, wherein the first ratio is 16:10 and the second ratio is 4:3.

5. A control method for a projector for displaying an image on a screen, the projector comprising a light source, and a light modulation device having a light modulation area for modulating light that exits the light source to effective image light representing an image, the method comprising:
   picking up an image of an area including the screen and the image light and generating a picked-up image;
   calculating each side of an outer peripheral line of the image light, based on the picked-up image;
   calculating each side of an outer peripheral line of the screen, based on the picked-up image;
   when three of four sides of the outer peripheral line of the screen in the picked-up image are detected, calculating a first imaginary screen outer peripheral line by supplementing one side that is undetected with one side of the outer peripheral line of the image light that is calculated;
   when an aspect ratio of an area defined by the first imaginary screen outer peripheral line is more vertically oriented than a first ratio, calculating the one undetected side according to a second ratio that is different from the first ratio, and calculating a second imaginary screen outer peripheral line that is different from the first imaginary screen outer peripheral line; and
   calculating a correction image light modulation area that is an area in a part of the light modulation area so as to fit inside the second imaginary screen outer peripheral line.

6. The control method according to claim 5, further comprising:
   calculating the correction image light modulation area maintaining an aspect ratio of the light modulation area in relation to the second imaginary screen outer peripheral line.

7. The control method according to claim 6, further comprising:
   calculating the correction image light modulation area to be inscribed within the second imaginary screen outer peripheral line.

8. The control method according to claim 5, wherein the first ratio is 16:10 and the second ratio is 4:3.

9. A non-transitory computer-readable storage medium having recorded thereon a computer program for controlling a projector for displaying an image on a screen, the projector comprising a light source, and a light modulation device having a light modulation area for modulating light that exits the light source to effective image light representing an image, the computer program causing a computer to execute processing for:
   picking up an image of an area including the screen and the image light and generating a picked-up image;
   calculating each side of an outer peripheral line of the image light, based on the picked-up image;
   calculating each side of an outer peripheral line of the screen, based on the picked-up image;
   when three of four sides of the outer peripheral line of the screen in the picked-up image are detected, calculating a first imaginary screen outer peripheral line by supplementing one side that is undetected with one side of the outer peripheral line of the image light that is calculated;
   when an aspect ratio of an area defined by the first imaginary screen outer peripheral line is more vertically oriented than a first ratio, calculating the one undetected side according to a second ratio that is different from the first ratio, and calculating a second imaginary screen outer peripheral line that is different from the first imaginary screen outer peripheral line; and
   calculating a correction image light modulation area that is an area in a part of the light modulation area so as to fit inside the second imaginary screen outer peripheral line.

10. The non-transitory computer-readable storage medium according to claim 9, the computer program further causing the computer to execute processing for:
    calculating the correction image light modulation area maintaining an aspect ratio of the light modulation area in relation to the second imaginary screen outer peripheral line.

11. The non-transitory computer-readable storage medium according to claim 10, the computer program further causing the computer to execute processing for:
    calculating the correction image light modulation area to be inscribed within the second imaginary screen outer peripheral line.

12. The non-transitory computer-readable storage medium according to claim 9, wherein the first ratio is 16:10 and the second ratio is 4:3.

* * * * *